United States Patent [19]
Boden et al.

[11] Patent Number: 5,315,424
[45] Date of Patent: May 24, 1994

[54] COMPUTER FIBER OPTIC INTERFACE

[75] Inventors: David E. Boden; Mandy M. H. Fong; John M. McReynolds, all of San Jose, Calif.

[73] Assignee: Loral Aerospace Corp., New York, N.Y.

[21] Appl. No.: 906,891

[22] Filed: Jun. 30, 1992

[51] Int. Cl.[5] ............................................. H04B 10/00
[52] U.S. Cl. ................... 359/152; 359/118; 359/158; 359/179; 369/713
[58] Field of Search .............. 359/118, 143, 152, 163, 359/197, 158, 173, 174, 176, 179; 395/145; 364/713

[56] References Cited

U.S. PATENT DOCUMENTS

| | | | |
|---|---|---|---|
| 4,796,301 | 1/1989 | Uzawa | 359/118 |
| 4,908,823 | 3/1990 | Haagens et al. | 359/158 |
| 4,941,201 | 7/1990 | Davis | 359/143 |
| 5,099,346 | 3/1992 | Lee et al. | 359/174 |

FOREIGN PATENT DOCUMENTS 0326696 12/1988 European Pat. Off. ...... G06F 13/38

OTHER PUBLICATIONS

T. Okabe, "PACS: Technical Perspective", IMAC89, Image Management and communication, 4, Jun. 1989, Washington, D.C.

S. K. Mun, "Image Management And communication (IMAC) in Radiology", Onde Electrique, vol. 71, No. 4, Jul., 1991, pairs France, pp. 26"31, XP243161.

Primary Examiner—Richard E. Chilcot, Jr.
Assistant Examiner—K. Negash
Attorney, Agent, or Firm—Kenneth W. Float; Anthony W. Karambelas

[57] ABSTRACT

High speed transfer of data over any distance can be easily achieved using high speed optical fibers and an optical fiber interface that couples signals transferred using the optical fibers to and from a computer. A specific implementation of the present invention is a fiber optic interface for a Macintosh brand computer that provides a direct fiber optic interface having no parts external to the computer that couples data to and from an optical image storage unit. The fiber optic interface circuit comprises an optical receiver coupled to a fiber optic cable for receiving optical signals from the image storage unit that converts them into corresponding electrical signals. An optical transmitter is coupled to a second fiber optic cable for converting electrical signals derived from the computer into optical signals and for transmitting them to the image storage unit. A plurality of data buffers are provided for buffering the electrical signals received from the optical receiver and to be transmitted by the optical transmitter. A compression circuit is provided for compressing the electrical signals generated by the optical receiver. A data buffer is provided for buffering the data signals received thereby. An interface circuit is provided for interfacing between the data buffer and a computer bus or backplane that forms a part of the computer.

9 Claims, 1 Drawing Sheet

COMPUTER FIBER OPTIC INTERFACE

BACKGROUND

The present invention relates generally to fiber optic interfaces, and more particularly, a fiber optic interface that may be employed with a computer system to provide a direct interface between the computer system and an image storage system coupled to the computer by way of optical cables.

In an image distribution system comprising a plurality of imaging consoles or computer workstations, it is generally required that images be distributed rapidly. Otherwise an operator using an imaging console has to wait long periods for images to appear on a display monitor. If the wait is too long, the operator may opt to use film instead of the imaging console. Film has a large effective image capacity, but is expensive, and it is clumsy to use, requiring chemicals to produce the images and large storage areas for retention of historical images. A high speed interface between an image storage device and image workstations has been used using copper cables. However, the length of the copper cables is very limited. Typical lengths for a 10 megabit per second data transfer rate are less than 100 feet. When the data rate is higher than 10 megabit per second or the distance is longer than 100 feet, another technique is necessary. A fiber optic relay may provide a high speed serial data path from the image storage device to a computer workstation.

The data transfer rates over a fiber optic link using inexpensive transmitters and receivers can be several kilometers. The conventional approach is to build the image storage device with a copper cable interface to a fiber optic interface where the data is transformed from parallel to serial form and then sent out to the image workstations at high data transfer rates, typically on the order of 100 megabits per second. The length of the copper cable is relatively short, since the transformation to the fiber optic cable can be close to the image storage unit. At the image workstation, there is a fiber optic receiver that converts the optical signal transmitted over the fiber back to an electrical signal suitable for transmission over a copper cable that ultimately connects to the image workstation. With this approach, however, there is a small external interface box that is attached to each image workstation. The external interface box provides the means for providing signal transformation from the optical fiber to the copper cable.

However, if the interface transformer from fiber to cable could be eliminated, the image workstation would be much simpler. The image workstations are the most numerous component in the system. Any simplification of the workstation reduces the cost of the total system in proportion to the level of the simplification. In a typical system, there are only one or two central optical storage units, or archive optical systems, and several host computers. When there are many (100) workstations, for example, a reduction of 10% in the cost of a workstation will have a dramatic effect on the overall cost of the system.

Therefore, it is an objective of the present invention to provide for a fiber optic interface that may be employed with a computer system to provide a direct interface between the computer system and an image storage device coupled to the computer by way of optical cables.

SUMMARY OF THE INVENTION

In order to achieve the above and other objectives, the present invention provides for a fiber optic interface circuit that couples data between an image storage unit or system and a computer workstation that are coupled together by way of first and second fiber optic cables. The fiber optic interface circuit comprises an optical receiver coupled to one of the fiber optic cables for receiving optical signals from the image storage system and converting them into corresponding electrical signals. An optical transmitter is coupled to the other of the fiber optic cables for converting electrical signals derived from the computer workstation into corresponding optical signals and for transmitting them to the image storage system. A plurality of data buffers are coupled to the optical receiver and optical transmitter for buffering the electrical signals received from the optical receiver and to be transmitted by the optical transmitter. A sum generator checker is coupled to the plurality of data buffers and then to a compression/decompression circuit. The compression/decompression is provided for compressing and decompressing the digital data generated from and to the workstation. A data buffer is coupled to the compression/decompression circuit (or to the sum generator checker for buffering data. An interface circuit, such as a Nubus TM -compatible interface for a Macintosh TM brand computer, is coupled to the data buffer for interfacing between the data buffer and a computer bus (backplane) of the computer workstation.

The fiber optic interface circuit provides direct fiber interface to the workstation and physically accepts the optical fiber that carries data signals from the image storage system and couples the data onto the computer bus at bus transfer rates. The fiber optic cables are inherently unidirectional. One fiber optic cable supplies an input to the image storage system and the other fiber optic cable provides the return path to the image storage system. The return path may be used to transfer command and acknowledgement signals back to the image storage system. Data flow can thus be in either direction, in that images may flow to the workstation for display, or they may flow from the work-station to the image storage system. The computer workstation is typically the source of image data that flows to the image storage system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
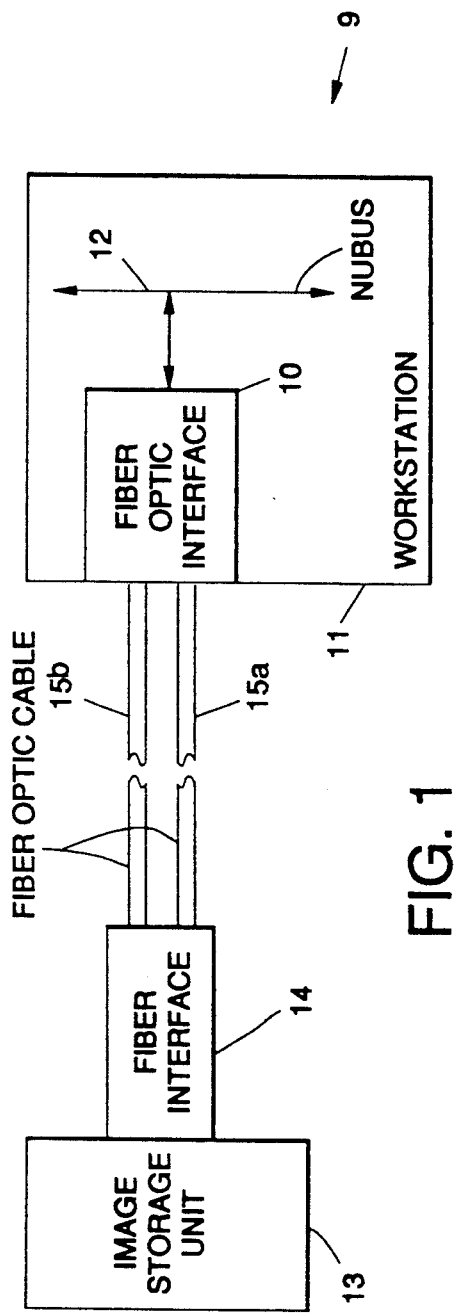
FIG. 1 shows an image storage system and an image workstation employing a fiber optic interface in accordance with the principles of the present invention.

Referring to the drawing figures, FIG. 1 shows a an image storage system 9, including an image storage unit or system 13 used by the assignee of the present invention, and an image workstation 11 employing a fiber optic interface 10 in accordance with the principles of the present invention. The fiber optic interface 10 provides a direct connection to a computer bus 12 or backplane 12 of the image workstation 11 by way of a plurality of optical fibers 15, or fiber optic cables 15. A bidirectional input/output fiber interface 14 is provided at the image storage system 13 that interfaces the two fiber optic cables 15 to the image storage system 13. The fiber optic interface 10 is adapted to couple and convert optical signals into electrical signals and vice versa to permit the direct coupling of the image storage system 13 to the computer workstation 11.

The fiber optic interface 10 is configured to physically accept the optical fiber 15 that carries the data signals from the image storage system 13 and couples the data signal to and from the computer bus 12 at bus rates. The fiber optic cables 15 are inherently unidirectional. Consequently, one fiber optic cable 15a supplies an input to the image storage system 13 and a second fiber optic cable 15b provides a return path from the image storage system 13 to the workstation 11. The return path provided by the second fiber optic cable 15b may also be used to transfer command and acknowledgement signals back to the image storage system 13. Data flow may be in either direction through the fiber optic interface 10, in that images may flow to the image workstation 11 for display, or they may flow from the workstation 11 to the image storage system 13 for storage. In general, however, the image workstation 11 is the source of image data that flows to the image storage system 13.

Figure 2:
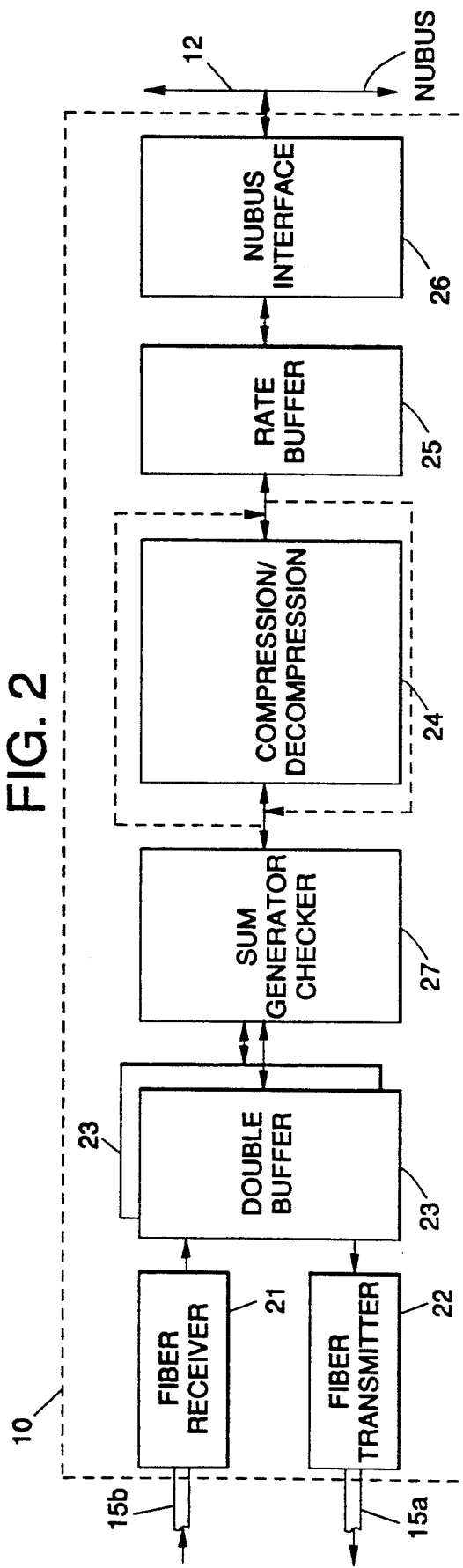
FIG. 2 shows the details of the fiber optic interface of FIG. 1.

The details of the structure of the fiber optic interface 10 are shown in FIG. 2. FIG. 2 is also illustrative of how the fiber optic interface 10 transforms optical data into electrical signals and buffers the data for transfer to or from the computer bus (backplane) 12.

The fiber optic interface 10 comprises an optical receiver 21 coupled to the second fiber optic cable 15b for receiving optical signals from the image storage system 13 and for converting them into corresponding electrical signals. An optical transmitter 22 is coupled to the first fiber optic cables 15a that is adapted to convert electrical signals derived from the computer workstation 11 into corresponding optical signals and for transmitting them to the image storage system 13. A plurality of data buffers 23 are coupled to the optical receiver 21 and optical transmitter 22 for buffering the electrical signals received from the optical receiver 21 and to be transmitted by the optical transmitter 22. A sum generator checker 27 is coupled to the plurality of data buffers 23. A compression/decompression circuit 24 is coupled to the sum generator checker 27 for decompressing electrical signals received by the optical receiver 21 or compressing electrical signals going to the optical transmitter 22. A rate data buffer 25 is coupled to the compression/decompression circuit 24 for buffering data signals received thereby. A Nubus interface circuit 26, for example, is coupled to the rate data buffer 25 for interfacing between the data buffer 25 and a Nubus computer bus 12 of the computer workstation 11.

The sum generator checker 27 is comprised of a field programmable gate array that implements longitudinal parity over each bit plane of data that is transmitted over the fiber optic cables 15a, 15b. Longitudinal in this respect is understood to mean the generation of parity from the comparison of the same bit in every byte of transmitted data. Data is serially transmitted over the fiber optic cables 15a, 15b. However, before it is transmitted, it is processed in 8 bit bytes. Longitudinal parity is generated by performing an exclusive OR operation on the same bit of each byte of a block of data. At the end of the block the results of this exclusive OR operation is a single 8 bit byte that represents the longitudinal parity for that block. This single 8 bit byte is inserted into the transmitting data stream along with the data and is recreated (regenerated) on the receive end and compared with the transmitted data. If the comparison of the resulting parity values do not equate, then an error has occurred and retransmission of the data occurs. The block size employed by the sum check generator 27 is determined by the plurality of double buffers 23, and is generally a constant.

More particularly, the optical receiver 21 and transmitter 22 are located at one edge of the fiber optic interface 10. The receiver 21 transforms the optical signals into electrical signals for use in the rest of the fiber optic interface 10 and workstation 11. The data flows through the double buffer 23 (typically 32 Kb of memory) that is used to control data flow and data manipulation. A simple data compression scheme is used in the compression/decompression circuit 24 to increase the effective data rate of received image data. The data compression scheme is as follows. Bits are encoded using a DPCM Huffman four-to-one algorithm. The Huffman encoding is based on the grey scale distribution of 16-bit image data. The data compression/decompression function performed in the compression/decompression circuit 24 is bit-reversing so the data delivered to the computer bus 12 is exactly the same as the original data. The compression/decompression circuit 24 may be bypassed as appropriate when the input data is not compressed. This is illustrated by the dashed data lines 31 coupled between the sum generator checker 27 and the rate data buffer 25. The rate data buffer 25 provides the buffering necessary for transferring the image data to the computer bus (backplane) 12. When the backplane 12 is ready to receive data, the data is transferred using a conventional block mode transfer protocol to move the data very rapidly to computer memory or other storage element coupled to the computer backplane 12. This block mode transfer protocol is described in "Designing Cards and Drivers for the Macintosh Family", available from Apple Computer, Inc.

The fiber optic interface 10 of the present invention has been implemented in a system comprising a Macintosh brand computer, model IIfx. For the Macintosh IIfx computer, the backplane 12 is a Nubus computer bus. Block mode transfer is one of the capabilities of the Nubus computer bus 12. The Macintosh block mode transfer protocol "captures" data on the backplane 12 and uses all of the backplane transfer cycles to move the data (into memory, for example) until the transfer is complete. This transfer mode is a superset of the DMA transfer routines of many computer central processing units (CPUs) that employ "cycle stealing" to permit transfer of data into memory. In the case of the Macintosh IIfx, all of the backplane transfer cycles are used until the data transfer is complete.

For the purposes of completeness, the fiber receiver 21 may be a model ODL125-1361BCE fiber receiver manufactured by AT&T, for example. The fiber transmitter 22 may be a model ODL125-1261BCE fiber transmitter manufactured by AT&T, for example. The plurality of data buffer 23 may be a model MT5C2568DJ manufactured by Micron, for example. The compression/decompression circuit 24 may be a model W002047 compression/decompression application specific integrated circuit (ASIC) manufactured by the assignee of the present invention, for example. The data buffer 25 may be a model IDR72225L data buffer manufactured by Integrated Devices Technology, for example. The interface circuit 26 may ba a model 1224307 Nubus interface ASIC circuit manufactured by Siemens Gammasonics, for example. The fiber optic cables 15 may be industrial standard 62.5 μm core multi-mode communication fiber optic cables, for example.

The benefits of using the present fiber optic interface 10 is that the data is transferred from the image storage system 13 to the computer workstation 11 at a very high data rate, typically on the order of 100 megabits per second, and is placed on the back-plane 12 of the workstation 11 very rapidly. Typically, one megabyte blocks of data are moved over the backplane 12 at a 30 megabyte per second rate as they are buffered in the fiber optic interface 10. The transfer of a 10 megabyte image into memory may be done in less than 0.5 seconds. The high data rate of the fiber optic cables 15, 15b, typically on the order of 100 megabits per second, is made to be effectively much higher, on the order of about 250 megabits per second, through the action of the compression/decompression scheme implemented in the compression/decompression circuit 24. Delays through the fiber optic interface 10 are small, so the data is available for display or for processing in a very short time.

The advantages of the present fiber optic interface 10 are that it provides for the direct input of the fiber optic signals to the workstation 11 without an intervening transformer that interfaces to the fiber optic cables 15a, 15b. The concepts of the present invention also apply to systems other than the Macintosh brand computer and an image storage system described with reference to the specific embodiment above. The concepts of the present invention may be used to support the transfer of images or data to other parts of an image processing system, for example. The present invention may also be used with any optical storage element and data other than image data may be moved to different kinds of computer workstations.

Thus there has been described a new and improved a fiber optic interface that may be employed with a computer system or workstation to provide a direct interface between the computer system and an image storage system coupled thereto by way of optical cables. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A fiber optic interface circuit that is adapted to couple data between an image storage system and a computer that are interconnected by way of first and second fiber optic cables, and wherein the image storage system comprises a bidirectional input/output fiber interface that interfaces the first and second fiber optic cables to the image storage system, said fiber optic interface circuit comprising:

an optical receiver coupled to one of the fiber optic cables for receiving optical signals transmitted from the image storage system and converting them into corresponding electrical signals;

an optical transmitter coupled to the other of the fiber optic cables for converting electrical signals derived from the computer into corresponding optical signals and for transmitting them to the image storage system;

a plurality of data buffers coupled to the optical receiver and optical transmitter for buffering the electrical signals received from the optical receiver and to be transmitted by the optical transmitter;

a sum generator checker coupled to the plurality of data buffers;

a rate data buffer coupled to the sum generator checker for buffering data signals received thereby; and an interface circuit coupled to the rate data buffer that is adapted to interface between the sum generator checker and a computer backplane of the computer.

2. The fiber optic interface circuit of claim 1 further comprising:

a compression/decompression circuit coupled between the plurality of data buffers and the data buffer for compressing and decompressing signals received and transmitted by the optical receiver.

3. The fiber optic interface circuit of claim 1 wherein the interface circuit comprises a Nubus interface circuit.

4. A fiber optic interface circuit that is adapted to couple data between an image storage system and a computer that are coupled together by way of first and second fiber optic cables, and wherein the image storage system comprises a bidirectional input/output fiber interface that interfaces the first and second fiber optic cables to the image storage system, said fiber optic interface circuit comprising:

an optical receiver coupled to one of the fiber optic cables for receiving optical signals transmitted from the image storage system and converting them into corresponding electrical signals;

an optical transmitter coupled to the other of the fiber optic cables for converting electrical signals derived from the computer into corresponding optical signals and for transmitting them to the image storage system;

a plurality of data buffers coupled to the optical receiver and optical transmitter for buffering the electrical signals received from the optical receiver and to be transmitted by the optical transmitter;

a sum generator checker coupled to the plurality of data buffers;

a compression/decompression circuit coupled to the sum generator checker for compressing signals received by the optical receiver;

a rate data buffer coupled to the compression/decompression circuit for buffering data signals received thereby; and an interface circuit coupled to the rate data buffer that is adapted to interface between the rate data buffer and a computer backplane of the computer.

5. The fiber optic interface circuit of claim 4 wherein the interface circuit comprises a Nubus interface circuit.

6. The fiber optic interface circuit of claim 4 wherein the compression/decompression circuit performs a bit-reversing bit compression/decompression scheme, so the data coupled to the computer backplane is the same as the original data at the image storage unit.

7. The fiber optic interface circuit of claim 5 wherein the compression/decompression circuit performs a bit-reversing bit compression/decompression scheme, so the data coupled to the computer backplane is the same as the original data at the image storage unit.

8. A fiber optic interface circuit that is adapted to couple data between an image storage system and a computer that are coupled together by way of first and second fiber optic cables, and wherein the image storage system comprises a bidirectional input/output fiber interface that interfaces the first and second fiber optic cables to the image storage system, said fiber optic interface circuit comprising:

- an optical receiver coupled to one of the fiber optic cables for receiving optical signals transmitted from the image storage system and converting them into corresponding electrical signals;
- an optical transmitter coupled to the other of the fiber optic cables for converting electrical signals derived from the computer into corresponding optical signals and for transmitting them to the image storage system;
- a plurality of data buffers coupled to the optical receiver and optical transmitter for buffering the electrical signals received from the optical receiver and to be transmitted by the optical transmitter;
- a sum generator checker coupled to the plurality of data buffers;
- a compression/decompression circuit coupled to the sum generator checker for compressing signals received by the optical receiver;
- a rate data buffer coupled to the compression/decompression circuit for buffering data signals received. thereby; and
- a Nubus interface circuit coupled to the rate data buffer that is adapted to interface between the rate data buffer and a Nubus computer backplane of the computer.

9. The fiber optic interface circuit of claim 8 wherein the compression/decompression circuit performs a bit-reversing bit compression/decompression scheme, so the data coupled to the computer backplane is the same as the original data at the image storage unit.

* * * * *